United States Patent [19]

Ishikawa et al.

[11] Patent Number: 5,327,933
[45] Date of Patent: Jul. 12, 1994

[54] CHECK VALVE OF FUEL TANK

[75] Inventors: Tatuzi Ishikawa; Kyokuichi Sato, both of Soja, Japan

[73] Assignee: OM Industrial Co., Ltd., Okayama, Japan

[21] Appl. No.: 127,815

[22] Filed: Sep. 28, 1993

[51] Int. Cl.⁵ .............................................. F16K 15/03
[52] U.S. Cl. ..................................................... 137/527.6
[58] Field of Search ................................ 137/527, 527.6

[56] References Cited

U.S. PATENT DOCUMENTS

| | | | |
|---|---|---|---|
| 3,498,322 | 3/1970 | Gilliam | 137/527.6 X |
| 4,495,859 | 1/1985 | Janke | 137/527.6 X |
| 4,774,981 | 10/1988 | Mizusawa | |
| 4,977,926 | 12/1990 | Hocking | |
| 4,989,635 | 2/1991 | Dunmire | |
| 5,044,396 | 9/1991 | Daudet et al. | |

Primary Examiner—Robert G. Nilson
Attorney, Agent, or Firm—Koda and Androlia

[57] ABSTRACT

This invention relates to a check valve of a fuel tank which is provided in an end portion of a fuel supply pipe for introducing fuel to the fuel tank, which end portion is located inside of the tank. The check valve comprises a valve plate which is large enough to cover the end face of the pipe, and a valve support which supports the valve plate by a connecting pin serving as a hinge, the valve support being of a semicylindrical shape having an inner diameter which is substantially equal to an outer diameter of the pipe to which the valve support is attached, the valve support being attached to the pipe by engaging concave and convex fitting means which are formed at least on end portions of the valve support on both sides and on the associated pipe.

3 Claims, 7 Drawing Sheets

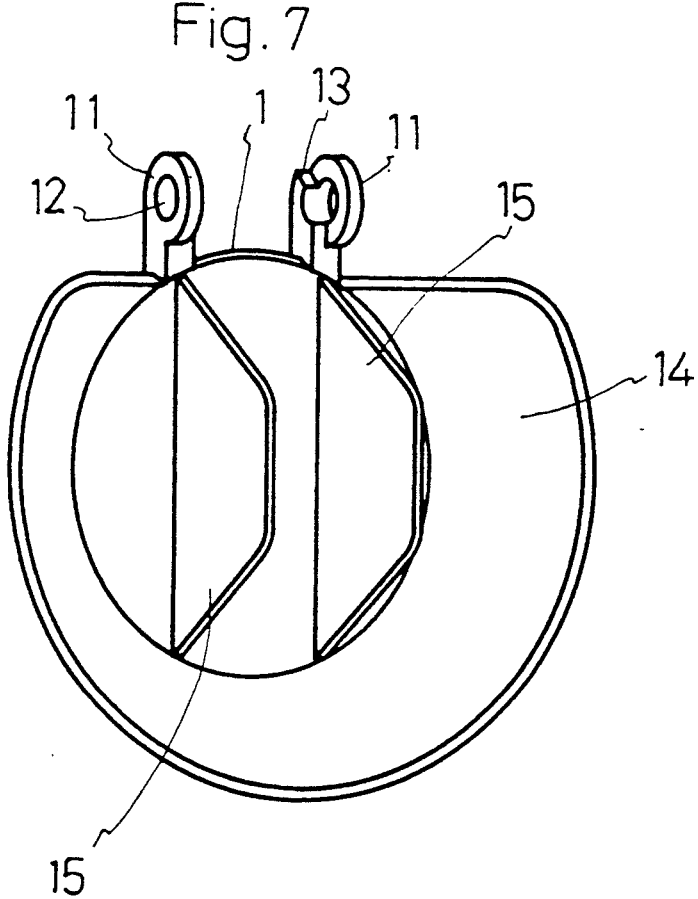

CHECK VALVE OF FUEL TANK

BACKGROUND OF THE INVENTION

1. Industrial Field of the Invention

The present invention relates to a check valve of a fuel tank, which is provided on an end portion of a fuel supply pipe for introducing fuel to the fuel tank, which end portion is located inside of the tank.

2. Description of the Prior Art

In order to prevent liquid fuel from flowing back to a fuel supply port due to an increase in the tank internal pressure at the time of fuel supply or the like, a check valve is provided in a fuel supply passage, and this check valve has a mechanism to be open when fuel flows normally during fuel supply and to be closed when fuel flows back.

Conventionally, for example, there have been a check valve comprising two semicircular valve plates, as disclosed in U.S. Pat. Nos. 4,774,981 and 4,977,926, a check valve which is opened and closed like an alligator's mouth, as disclosed in U.S. Pat. No. 5,044,396, and a check valve comprising a circular valve plate similar to the present invention, as disclosed in U.S. Pat. No. 4,989,635. As obviously understood from these examples, a valve plate is generally attached to joints by means of a pin. In this method, however, the pin must be designed not to come off after the assembly. Therefore, the pin must be press-fitted into the joints, or the pin must be processed afterwards, for example, by crushing the tip of the pin. Moreover, a check valve is attached to a fuel supply pipe by welding or press-fitting the valve into the pipe or fixing the valve by fasteners, which is a difficult operation to be performed in a sealed tank.

Especially, a check valve of the type which is attached to an end portion of a fuel pipe which is projected into a tank, as in this invention, is different from a check valve of the type which is provided inside of the fuel passage in that fuel collides against the valve plate forcefully, splashes in all directions and falls into the tank. If a large amount of fuel splashes, a large amount of fuel vapor will be generated in the tank, so that prevention devices must be provided not to destroy the natural environment by diffusion of fuel gas. Consequently, fuel splash must be suppressed to prevent generation of fuel vapor as much as possible.

SUMMARY OF THE INVENTION

Taking the above-described problems into account, the inventors of the present application performed various investigations about the structure which facilitates the assembly of a check valve itself and the structure of a valve support by which the check valve can be easily attached to a fuel supply pipe. Also, in order to prevent fuel splash to suppress gasification of fuel to the minimum, there were performed improvements on the configuration and attached condition of the valve plate which causes more splash of fuel than the valve having two valve plates and the valve like an alligator's mouth.

As a result, there has been developed a check valve of a fuel tank comprising a valve plate which is large enough to cover the end face of a pipe, and a valve support which supports the valve plate by a connecting pin serving as a hinge, the valve support being of a semicylindrical shape having an inner diameter which is substantially equal to an outer diameter of the pipe to which the valve support is attached, the valve support being attached to the pipe by engaging concave and convex fitting means which are formed at least on end portions of the valve support on both sides and on the associated pipe.

As the concave and convex fitting means, projections toward the axial center of the pipe which extend in parallel to the pipe axis are formed on the valve support, and also, grooves corresponding to these projections are formed in the outer periphery of the associated pipe, so that the projections and the grooves will be closely fitted with each other. Consequently, by merely pressing the valve support toward the associated pipe by a hand and fitting it on the pipe, the valve plate can be attached to the end portion of the associated pipe easily with one touch. After the attachment, the valve will not rotate nor come off but be securely fixed on the pipe even if a load is exerted on the valve support for a reason, for example, that a pressing force produced by a fuel flow is exerted on the valve plate. These concave and convex fitting means prevent the valve support from rotating when they are provided in parallel to the pipe axis. Therefore, in addition to the above-mentioned projections and grooves in parallel to the pipe axis, a plurality of projections and their receiving holes may be formed at positions in parallel to the pipe axis. It does not matter which of the projections and grooves or the plurality of projections and their receiving holes are formed on which of the valve support and the pipe.

When the connecting pin of the invention device is inserted into pin receiving holes, the slot is narrowed so that the retaining portion can easily pass through the pin receiving holes. After the retaining portion has passed through them, the slot is widened again, and the retaining portion is engaged with a side face of a joint of the valve plate so as to fix the connecting pin. Thus, attachment of the valve plate to the valve support can be readily effected. After the attachment, the valve plate will not come off easily.

At the time of attachment of the valve plate, the opening degree is restricted by stepped portions which are formed on joints. When an enlarged peripheral portion is formed on the outer periphery of the valve plate and extends over the end face of the pipe, the enlarged peripheral portion serves as a fuel splash preventing wall to prevent gasification of liquid fuel. Further, when one or a plurality of erect plates are formed on the inner surface of the valve plate on the pipe side and extend in a direction perpendicular to the opening/closing axis of the valve plate, the erect plates serving as flow straighteners of liquid fuel as well as the above-mentioned enlarged peripheral portion enable quiet inflow of liquid fuel from the pipe to the tank.

BRIEF DESCRIPTION OF THE DRAWINGS

FIG. 7 is a rear perspective view of the same.

DETAILED DESCRIPTION OF THE INVENTION

Figure 1:
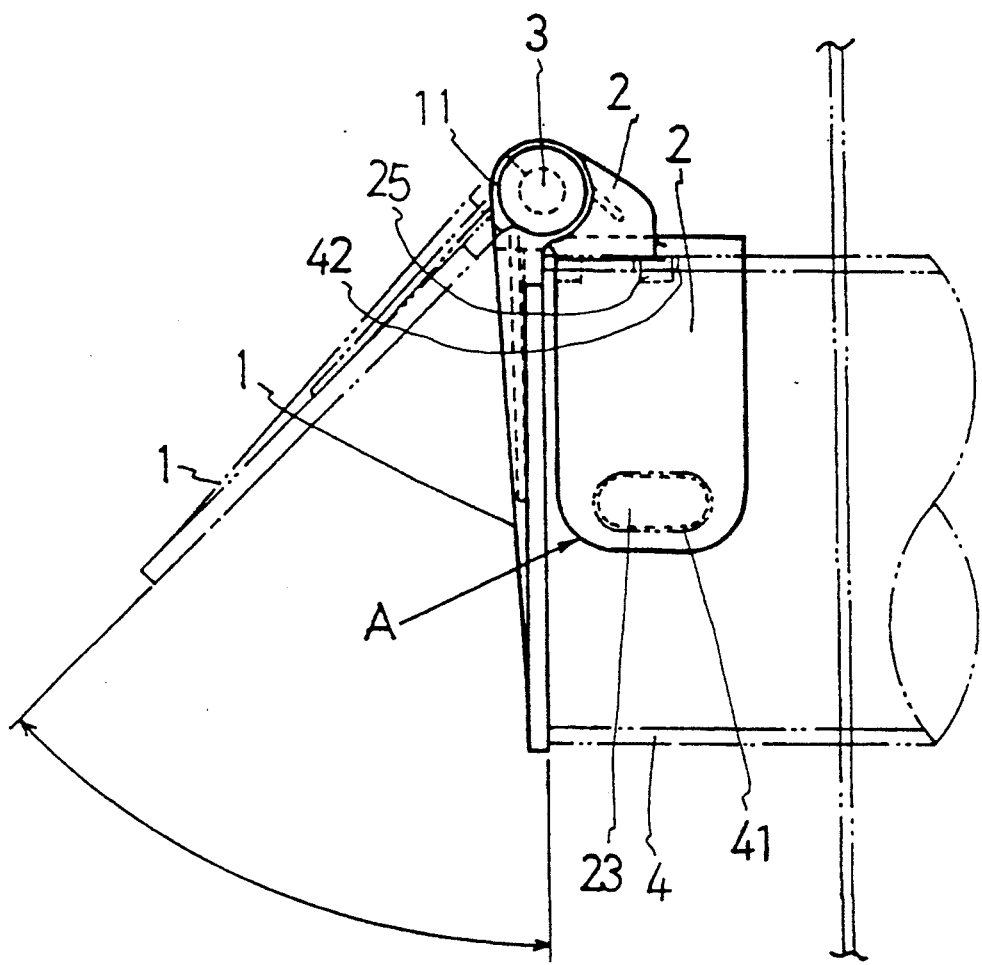
FIG. 1 is a side view of a check valve.

As shown in FIGS. 1 to 4, a check valve according to the present invention comprises three members, i.e., a valve plate 1, a valve support 2 and a connecting pin 3. These members may be made of metal. However, when they are made of an oil-proof plastic material, they can be easily molded. The valve plate 1 is a disk having a diameter enough to close an opening end of a pipe 4 to which the valve is to be attached, this opening end being located inside of a tank. Two joints 11 are formed on the periphery of the valve plate 1 at a predetermined interval. Each of the joints 11 has a joint hole 12 into which the connecting pin 3 is inserted.

The valve support 2 is of a substantially semicylindrical shape having an inner diameter which is substantially the same as an outer diameter of the associated pipe 4. Two holders 21 and their pin receiving holes 22 are formed on a central part of the outer periphery of the semicylindrical portion of the valve support 2 at a predetermined interval, and projections 23 are formed on the inner surface of the semicylindrical portion of the valve support 2 in the vicinity of opposite ends thereof, the projections 23 extending in parallel to the pipe axis and toward the axial center of the pipe. The joints 11 and the holders 21 include stepped portions 13 and 24 to engage with each other, and the stepped portions 13 and 24 serve as stoppers for restricting an opening degree of the valve plate 1. Also, a projection 25 is formed on a middle part of the inner periphery of the valve support 2. When the projection 25 is fitted in a hole 42 in the pipe 4 at the time of attachment of the valve, the valve plate 1 can be prevented from being erroneously attached to the pipe 4 upside down.

The connecting pin 3 to be inserted in the joint holes 12 and the pin receiving holes 22 comprises a flange head portion 31 having a larger diameter than the joint holes 12 which is formed on one end thereof, and a tapered retaining portion 33 formed on the other end thereof, the retaining portion 33 including a slot 32 extending along the axial center. The retaining portion 33 has a smaller diameter than the joint holes 12 at its distal end, and the diameter gradually increases toward the flange head portion 31 until it is larger than that of the joint holes 12. This connecting pin 3 serves as a hinge for the valve plate 1 when it is inserted through the joints 11 of the valve plate 1 and the holders 21 of the valve support 2. A torsion coil spring 5 is fitted around the connecting pin 3 so as to urge the valve plate 1 constantly in the closing direction. The structure of these components is more obviously shown in an exploded perspective view of FIG. 4.

Figure 2:
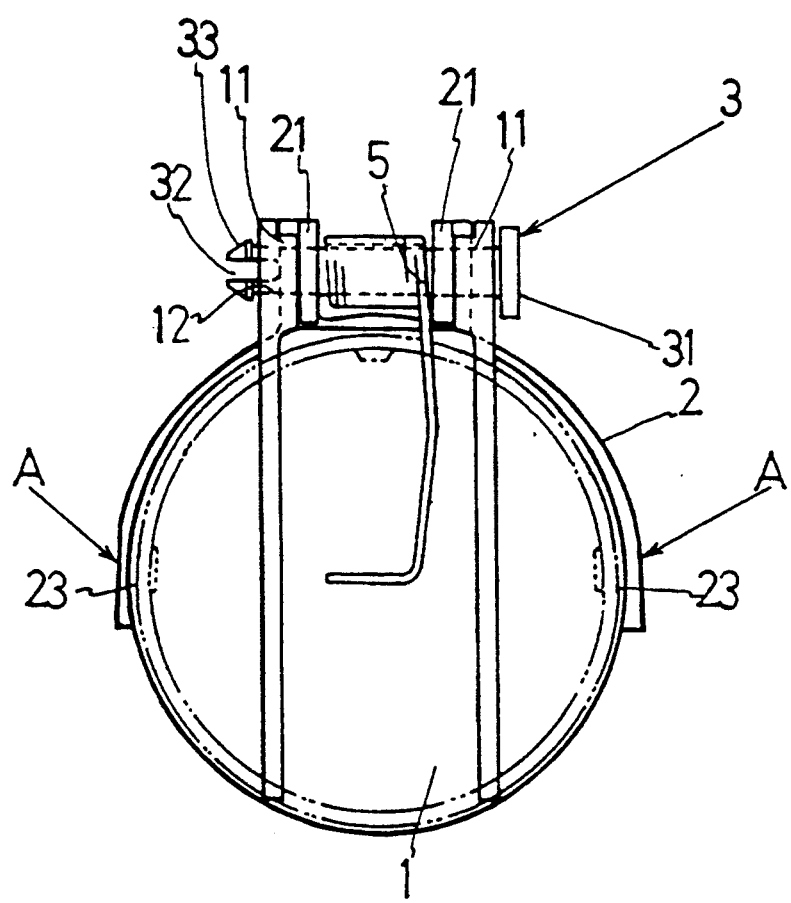
FIG. 2 is a front view of the check valve.
Figure 3:
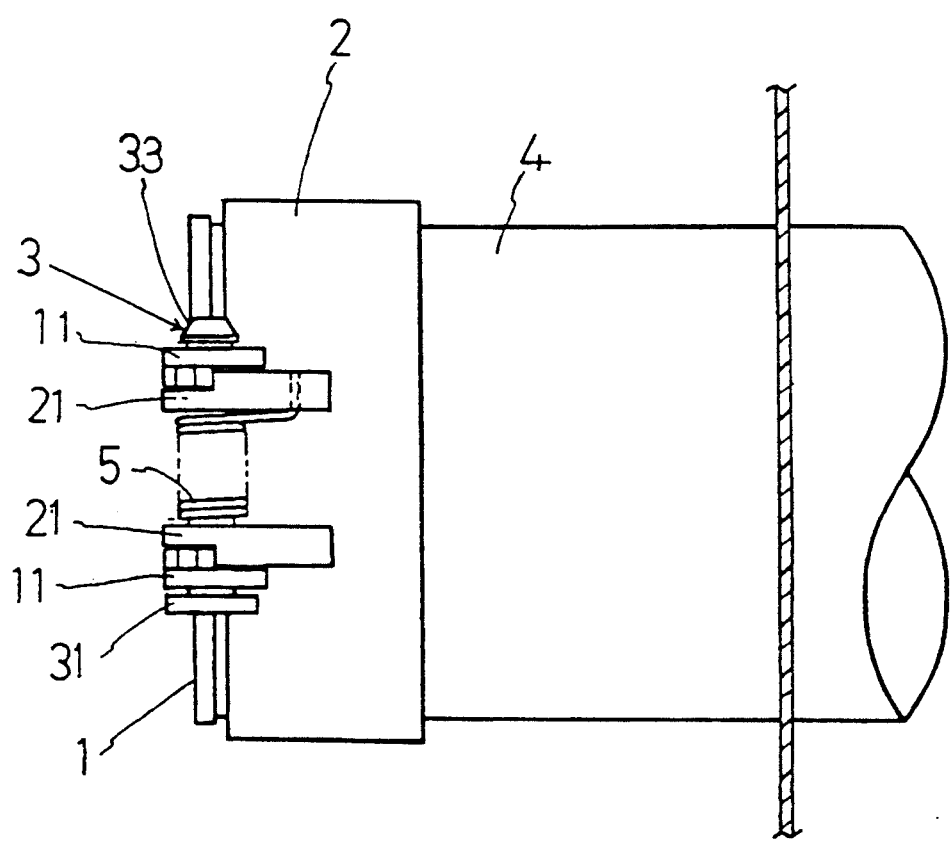
FIG. 3 is a plan view of the check valve.
Figure 4:
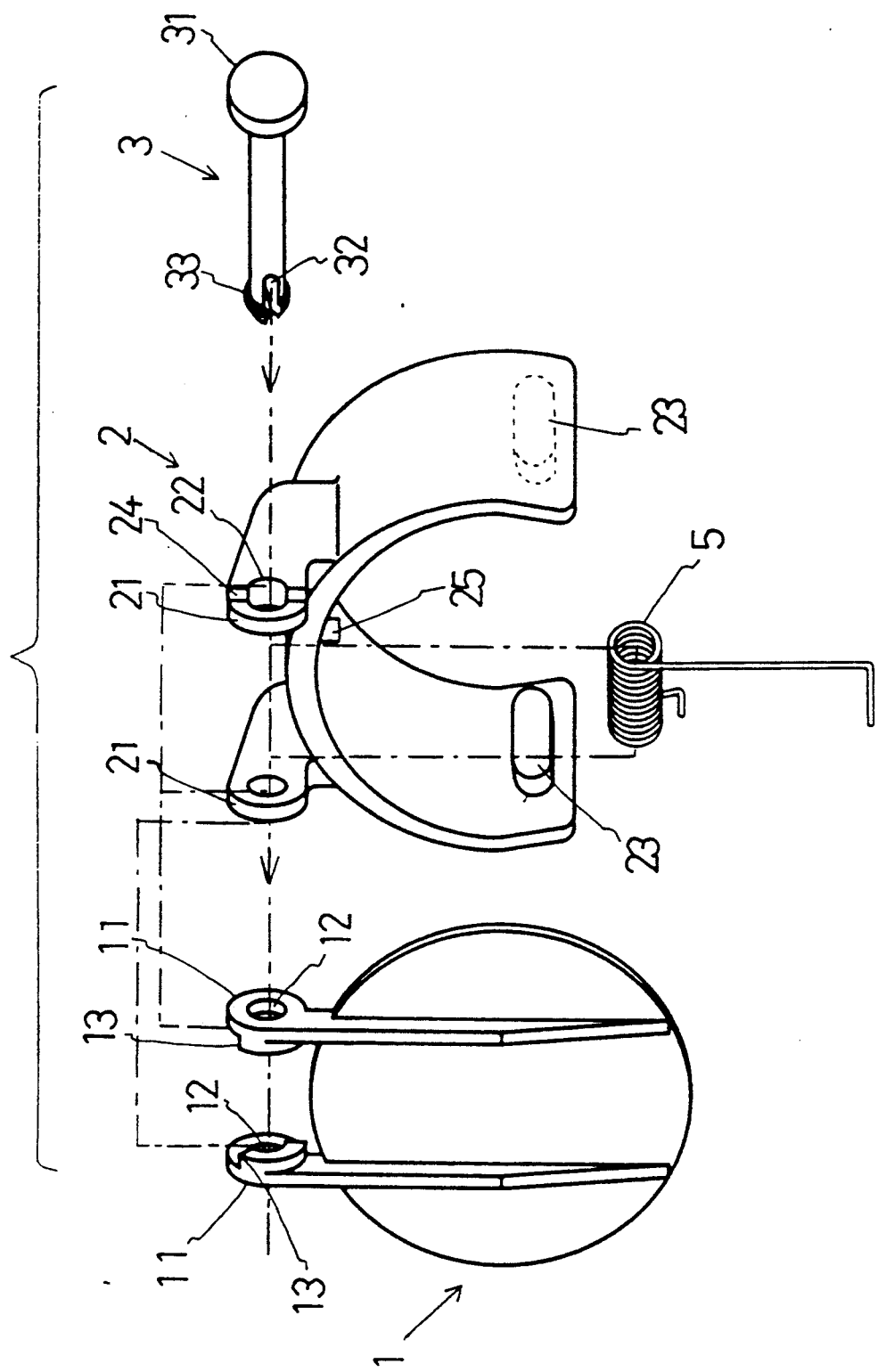
FIG. 4 is an exploded perspective view of the check valve.
Figure 5:
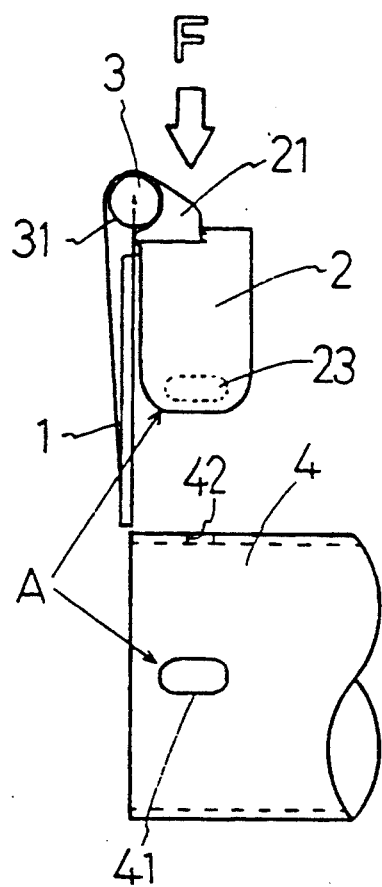
FIG. 5 is a side view of the check valve before it is attached to a pipe.
Figure 6:
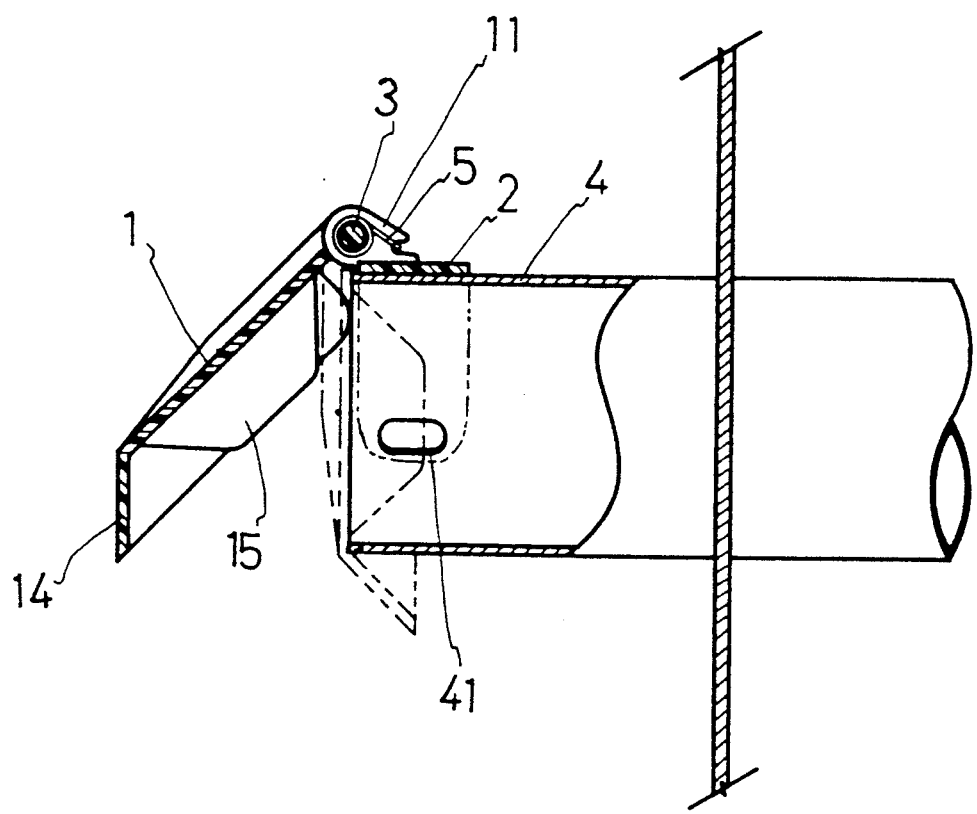
FIG. 6 is a partially broken-away side view of a different valve plate.

FIG. 5 shows a condition in which the check valve of a fuel tank according to the present invention is being mounted on the pipe 4. While holding the semicylindrical portion of the valve support 2 by a hand, the check valve is pressed down toward the axial center of the pipe 4 and fitted on the pipe 4. Thus, concave and convex fitting means A, i.e., the projections 23 are fitted in grooves 41, so that the check valve is securely fixed on the pipe 4. In this state, even if a pressing force produced by a fuel flow is exerted on the valve plate 1 at the time of fuel supply and the valve support 2 is affected by a torsional load, the valve support 2 is prevented from rotating or coming off the pipe 4. The projections 23 formed on the valve support 2 are located at positions in the diametrically opposite relation of the pipe 4, as shown in FIG. 1 or 2. Alternatively, the projections 23 may be located at positions lower than these positions, as shown in FIG. 6. As a result, the valve plate 1 can be prevented from being erroneously attached upside down, and also, the valve support 2 and the pipe 4 are assembled so securely that the valve support 2 can not be detached from the pipe 4 without more difficulty. Therefore, it is not necessary to prevent erroneous attachment by forming the inner projection 25 on the valve support 2 and the hole 42 in the pipe 4 in which the projection 25 is fitted.

Restriction of the opening degree of the valve plate by the stepped portions 13 of the joints 11 and the stepped portions 24 of the holders 21 described above performs an important function in the check valve according to the present invention. That is to say, these stoppers for the opening restriction restrict a torsion angle of the torsion coil spring 5 so as to prevent excessive torsion of the spring, thereby increasing the durability of the torsion coil spring. Also, the force of entering fuel is lessened when the fuel first collides against the valve plate whose opening degree is restricted to be half-open, so that the speed of the fuel dashing into the tank is decreased, to thereby suppress splashing to the surroundings and foaming. Further, in order to stop a back flow of fuel, the valve plate must be closed quickly. In this relation, restriction of the opening degree is preferred because an angle between the closed state and the open state is not larger than necessary so that the distance of opening/closing movement is shortened to increase the responding speed for closing the valve.

In the check valve according to the present invention, the valve plate 1 is also improved to prevent gasification of liquid fuel during fuel supply. One embodiment of this improvement is shown in FIGS. 6 and 7. When a valve plate 1 is attached, the opening degree is restricted by stepped portions which are formed on joints. The valve plate 1 includes an enlarged peripheral portion 14 which is formed on its outer periphery and extends over the end face of the pipe 4, so that gasification due to fuel splash can be prevented. Further, the valve plate 1 includes one or a plurality of trapezoidal erect plates 15 which extend toward the inside of the pipe 4 in a direction perpendicular to the opening/closing axis of the valve plate when the valve plate 1 is attached to the pipe 4. The erect plates 15 serving as flow straighteners of fuel as well as the wall of the above-mentioned enlarged peripheral portion 14 enable quiet inflow of fuel from the pipe to the tank.

According to the present invention, the valve plate can be attached to the fuel inlet pipe in the fuel tank easily with one touch, and can be securely fixed after the attachment. Thus, the assembling efficiency can be improved and the costs can be reduced. Moreover, the opening restriction of the valve plate and the improvement of the configuration of the valve plate itself can prevent gasification of fuel due to splashing and spraying of fuel in the tank when the fuel is supplied to the tank, thereby suppressing fuel loss and air pollution to the minimum.

What is claimed is:
1. A check valve of a fuel tank comprising:
  a valve plate having joints on one peripheral side;
  a valve support integrally formed with holders for the valve plate, said valve support being of a semicylindrical shape having an inner diameter which is substantially equal to an outer diameter of a pipe to which the valve support is attached, said valve support being attached to said associated pipe by engaging projections and grooves or a plurality of projections and their receiving holes which are formed at least on end portions of the valve support on both sides and on said associated pipe; and a connecting pin inserted through the joints and the holders, said connecting pin including a flange head portion which is formed on one end thereof and has a larger diameter than pin receiving holes and a slot which is formed on the other end and extends along the axial center, said connecting pin being integrally formed with a retaining portion whose distal end portion has a smaller diameter than the pin receiving holes, which diameter gradually increases toward the flange head portion until it is larger than that of the pin receiving holes, so that the connecting pin serves as a hinge of the valve plate.

2. A check valve of a fuel tank according to claim 1, wherein said valve plate includes an enlarged peripheral portion which is formed on the outer periphery of the valve plate and extends over the end face of the pipe, to thereby serve as a wall for preventing fuel splash.

3. A check valve of a fuel tank according to claim 1, wherein said valve plate includes one or a plurality of erect plates which are formed on the inner surface of the valve plate on the pipe side in a direction perpendicular to the opening/closing axis, to thereby serve as flow straighteners.

* * * * *

UNITED STATES PATENT AND TRADEMARK OFFICE
CERTIFICATE OF CORRECTION

PATENT NO. : 5,327,933
DATED : July 12, 1994
INVENTOR(S) : Tatuzi Ishikawa, et al.

It is certified that error appears in the above-identified patent and that said Letters Patent is hereby corrected as shown below:

On title page, item

[30] Foreign Application Priority Data:

Add --September 29, 1992 [JP] Japan ........... 4-67664[U]--

Signed and Sealed this

Fourteenth Day of March, 1995

*Attest:*

BRUCE LEHMAN

*Attesting Officer*         *Commissioner of Patents and Trademarks*